(12) United States Patent
Amin et al.

(10) Patent No.: US 11,240,255 B1
(45) Date of Patent: Feb. 1, 2022

(54) SYSTEM AND METHOD TO RECOGNIZE UNAUTHENTICATED VISITORS

(71) Applicants: Ali Amin, Mountain View, CA (US); Lewis Dawson, Mountain View, CA (US); Shweta Singh, Mountain View, CA (US); Tim Spaulding, Mountain View, CA (US); Josh Rab, Mountain View, CA (US); Giovanna Diaz, Mountain View, CA (US); Tera Thomas, Mountain View, CA (US); Gonzalo Galicia, Mountain View, CA (US)

(72) Inventors: Ali Amin, Mountain View, CA (US); Lewis Dawson, Mountain View, CA (US); Shweta Singh, Mountain View, CA (US); Tim Spaulding, Mountain View, CA (US); Josh Rab, Mountain View, CA (US); Giovanna Diaz, Mountain View, CA (US); Tera Thomas, Mountain View, CA (US); Gonzalo Galicia, Mountain View, CA (US)

(73) Assignee: Intuit Inc., Mountain View, CA (US)

( * ) Notice: Subject to any disclaimer, the term of this patent is extended or adjusted under 35 U.S.C. 154(b) by 691 days.

(21) Appl. No.: 15/885,781

(22) Filed: Jan. 31, 2018

(51) Int. Cl.
*H04L 29/00* (2006.01)
*H04L 29/06* (2006.01)
(Continued)

(52) U.S. Cl.
CPC .......... *H04L 63/126* (2013.01); *G06F 16/285* (2019.01); *H04L 63/04* (2013.01); *G06Q 40/00* (2013.01); *H04L 67/02* (2013.01)

(58) Field of Classification Search
CPC ............................ H04L 63/126; G06F 16/285
(Continued)

(56) References Cited

U.S. PATENT DOCUMENTS 9,124,583 B1 * 9/2015 Amaladoss ......... H04L 63/0884
10,187,394 B2 * 1/2019 Bar ....................... G06F 21/316
(Continued)

FOREIGN PATENT DOCUMENTS

WO    WO-2015002938 A1 *   1/2015   ............. G06F 9/451

*Primary Examiner* — Jeffrey C Pwu
*Assistant Examiner* — Michael D Anderson
(74) *Attorney, Agent, or Firm* — Ferguson Braswell Fraser Kubasta PC (57) ABSTRACT

A method involves: receiving a request to access a first online financial application from a client device, where the first online financial application is one of a many online financial applications made available by an online financial service, and where the many online applications includes a second online application; attempting to generate a browser fingerprint for a browser application on the client device by applying a fingerprinting algorithm to one or more items of browser metadata; associating the browser fingerprint, if generated, with external user data obtained from a web analytics tool and internal user data obtained from the online financial service; receiving login credentials for the first online financial application from a user of the client device; retrieving, using the login credentials, additional internal user data maintained by the online financial service; personalizing, upon detecting the browser fingerprint and using the external user data, the internal user data, and the additional internal user data, a user interface presented by the second online financial application to the user.

20 Claims, 9 Drawing Sheets

(51) Int. Cl.
 *G06F 16/28* (2019.01)
 *H04L 29/08* (2006.01)
 *G06Q 40/00* (2012.01)
(58) Field of Classification Search
 USPC .......................................................... 726/4
 See application file for complete search history.

(56) References Cited

U.S. PATENT DOCUMENTS

2015/0170175 A1\* 6/2015 Zhang ................... H04M 15/44
 705/7.33
2018/0033011 A1\* 2/2018 Bhattacharjee .... G06Q 20/4016

\* cited by examiner

SYSTEM AND METHOD TO RECOGNIZE UNAUTHENTICATED VISITORS

Many software applications, including online financial applications, are marketed using free and paid versions.

Research shows that users who have a personalized experience with a software application are more likely to continue to use the software application, which, in turn, increases the likelihood of conversion from a free to a paid version.

Most software providers use details from user profiles to personalize the views in the graphical user interface (GUI) presented by their software applications, e.g., with text greetings that recognize the user and remind the user of his/her historical use. Of course, identifying a user following presentation of the user's login credentials is a trivial matter. So such personalization following login is easily accomplished.

In the past, browser cookies were used to identify a user prior to the presentation of his/her credentials. But cookies are of limited usefulness when users use multiple devices and many users (1) use the privacy settings in their browsers to prevent the use of browser cookies or (2) delete browser cookies periodically. Consequently, pre-login personalization of GUI views remains an ongoing area of research and study.

SUMMARY

In general, in one aspect the invention relates to a method, comprising: receiving a request to access a first online financial application from a client device, wherein the first online financial application is one of a plurality of online financial applications made available by an online financial service, and wherein the plurality of online applications includes a second online application; attempting to generate a browser fingerprint for a browser application on the client device by applying a fingerprinting algorithm to one or more items of browser metadata; associating the browser fingerprint, if generated, with external user data obtained from a web analytics tool and internal user data obtained from the online financial service; receiving login credentials for the first online financial application from a user of the client device; retrieving, using the login credentials, additional internal user data maintained by the online financial service; personalizing, upon detecting the browser fingerprint and using the external user data, the internal user data, and the additional internal user data, a user interface presented by the second online financial application to the user.

In general, in one aspect the invention relates to a non-transitory computer-readable media storing a program, which when executed by a processor, performs: receiving a request to access a first online financial application from a client device, wherein the first online financial application is one of a plurality of online financial applications made available by an online financial service, and wherein the plurality of online applications includes a second online application; attempting to generate a browser fingerprint for a browser application on the client device by applying a fingerprinting algorithm to one or more items of browser metadata; associating the browser fingerprint, if generated, with external user data obtained from a web analytics tool and internal user data obtained from the online financial service; receiving login credentials for the first online financial application from a user of the client device; retrieving, using the login credentials, additional internal user data maintained by the online financial service; personalizing, upon detecting the browser fingerprint and using the external user data, the internal user data, and the additional internal user data, a user interface presented by the second online financial application to the user.

In general, in one aspect the invention relates to system, comprising: a hardware processor and memory; and software instructions stored in the memory. The software instructions, which when executed by the hardware processor, cause the hardware processor to: receive a request to access a first online financial application from a client device, wherein the first online financial application is one of a plurality of online financial applications made available by an online financial service, and wherein the plurality of online applications includes a second online application, attempt to generate a browser fingerprint for a browser application on the client device by applying a fingerprinting algorithm to one or more items of browser metadata, associate the browser fingerprint, if generated, with external user data obtained from a web analytics tool and internal user data obtained from the online financial service, receive login credentials for the first online financial application from a user of the client device, use the login credentials to retrieve additional internal user data maintained by the online financial service, and personalize, upon detecting the browser fingerprint and using the external user data, the internal user data, and the additional internal user data, a user interface presented by the second online financial application to the user.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or proceed) the second element in an ordering of elements.

In general, one or more embodiments of the invention help solve the problem of personalizing the GUI views that an online financial application presents to a user, prior to receipt of the user's logon credentials. In embodiments, an online financial service hosts several online financial applications, each of which is massively multi-user. When a user of one of the online financial applications (e.g., an online tax application), requests access to the online financial application through a browser (e.g., a web browser) on a client device (e.g., a smartphone, tablet, laptop, desktop, etc.), the online financial service generates a browser fingerprint from the browser's metadata, using a browser fingerprinting algorithm. Then, when the same user requests access to another one of the online financial applications, the financial service uses the browser fingerprint to retrieve details about the user from the user's profile, which are used to personalize the GUI views that the other online financial application presents to the user. Particularly, the personalization of the GUI view used in other online financial applications occurs prior to receiving the user's logon credentials.

Figure 1A:
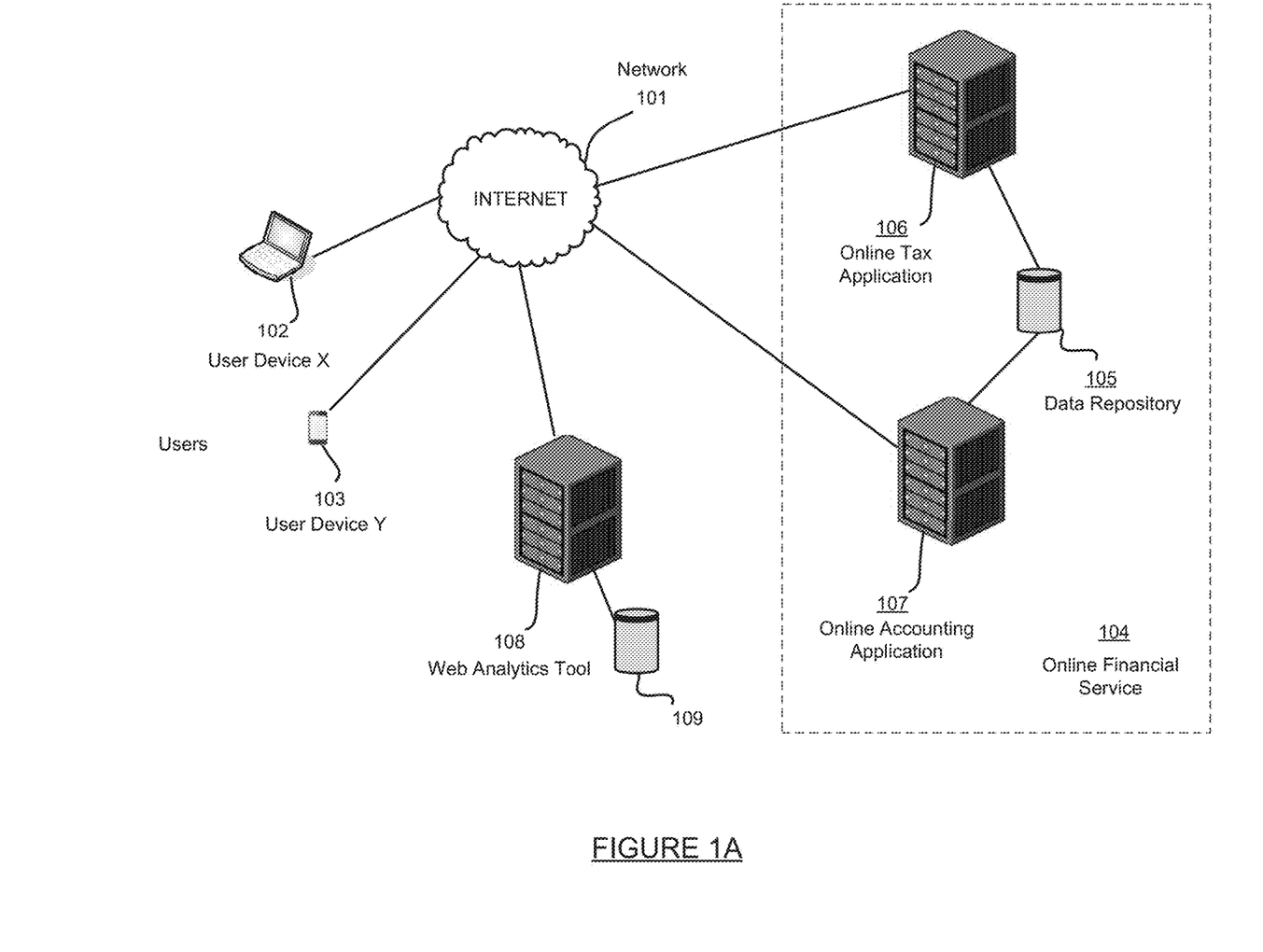
FIG. 1A depicts a network diagram showing a system that includes functionality for providing a personalized interface for a user, in accordance with one or more embodiments.

FIG. 1A depicts a network diagram showing a system that includes functionality for providing a personalized interface for a user, in accordance with one or more embodiments. As depicted in FIG. 1A, users may use user computing device X (102) (e.g., a laptop or other personal computer) and/or user computing device Y (103) (e.g., a mobile device such as a smartphone or a tablet computer) to access over network (101): (a) an online financial service (104) with computing resources (e.g., hardware servers) that host a plurality of online financial applications, such as a massively multi-user online tax application (106) (e.g., TurboTax Online™) and a massively multi-user online accounting application 107 (e.g., QuickBooks Online™); and (b) a web or cloud analytics tool (108) such as Adobe Audience Manager (which is part of Adobe Marketing Cloud), Adobe Marketing Cloud Co-Op, 12 Bridges, etc., and its data repository (109). It will be appreciated that Adobe Marketing Cloud Co-Op and 12 Bridges allow the identification of a user across multiple devices. Network (101) is a wide area network (WAN) including the Internet, which is wireless in part or in whole.

In one or more embodiments, computing device X (102) and the servers at online tax service (104) include: (1) hardware with one or more microprocessors (e.g., from the x86 family, the ARM family, or the PowerPC family), volatile storage (e.g., Random Access Memory (RAM), Virtual Memory), and persistent storage (e.g., flash memory, a hard disk, or a solid-state drive); and (2) an operating system (e.g., WINDOWS®, iOS®, LINUX®, WINDOWS SERVER™, etc.) capable of running on the hardware.

In one or more embodiments, user computing device Y (103) is a smart phone and includes: (1) hardware with one or more microprocessors (e.g., from the ARM family or the x86 family), volatile storage (e.g., RAM), and persistent storage (e.g., flash memory such as microSD); (2) an operating system (e.g., iOS®, ANDROID™, WINDOWS MOBILE®, LINUX®, SYMBIAN OS®, etc.) that runs on the hardware; (3) one or more accelerometers, one or more gyroscopes, one or more magnetometers, one or more pedometers, and one or more barometers; (4) a global positioning system (GPS), a global navigation satellite system (e.g., GNSS), Visual-Inertial Odometry (VIO), an/or other location-identifying capability; and (5) a camera.

In one or more embodiments, an online financial service (104) includes computing resources with a number of servers (e.g., racked servers) connected by a network (e.g., a local area network (LAN) or a WAN) to each other in a cluster (e.g., a load-balancing cluster, a HADOOP cluster, a Beowulf cluster, etc.) or other distributed system which might run online financial service software (e.g., an online tax application, an online accounting application, web-server software, database software, etc.) and distributed-computing and/or cloud software, such as Map-Reduce, Google File System, HADOOP®, HADOOP File System, HADOOP® YARN, Hive, Dremel, CloudBase, Memcached, REDIS®, etc. The servers at an online financial service (104) are connected to a data repository (105). The data repository (105) might include flash memory, a redundant array of independent disks (RAID), and/or a storage area network (SAN), in one or more embodiments. Additionally or alternatively, the online financial service (104) and/or the data repository (105) might be hosted wholly or partially in a public and/or private cloud, e.g., where the cloud resources serve as a platform-as-a-service (PaaS) or an infrastructure-as-a-service (IaaS). In one or more embodiments, the online financial service (104) might use the machine learning and/or artificial intelligence (AI) services provided by Amazon Web Services (AWS), e.g., to create a cohort (or segment) of similar users using a clustering algorithm.

Returning to FIG. 1A, in one or more embodiments, user computing device X (102) and user computing device Y (103) each include a web browser as an application program (or app) or as part of an operating system. Examples of web browsers that might execute on user computing device X (102) include INTERNET EXPLORER®, MOZILLA FIREFOX®, SAFARI®, and GOOGLE CHROME™. Examples of web browsers that might execute on user computing device Y (103) include SAFARI®, MOZILLA FIREFOX® and Android™. It will be appreciated that users of user computing device X (102) and/or user computing device Y (103) might use web browsers to access an online tax application (106) or online accounting application (107) hosted by online financial service (104). Additionally or alternatively, users of user computing device X (102) and/or user computing device Y (103) may use other application programs or apps to access online financial service (104).

Figure 1B:
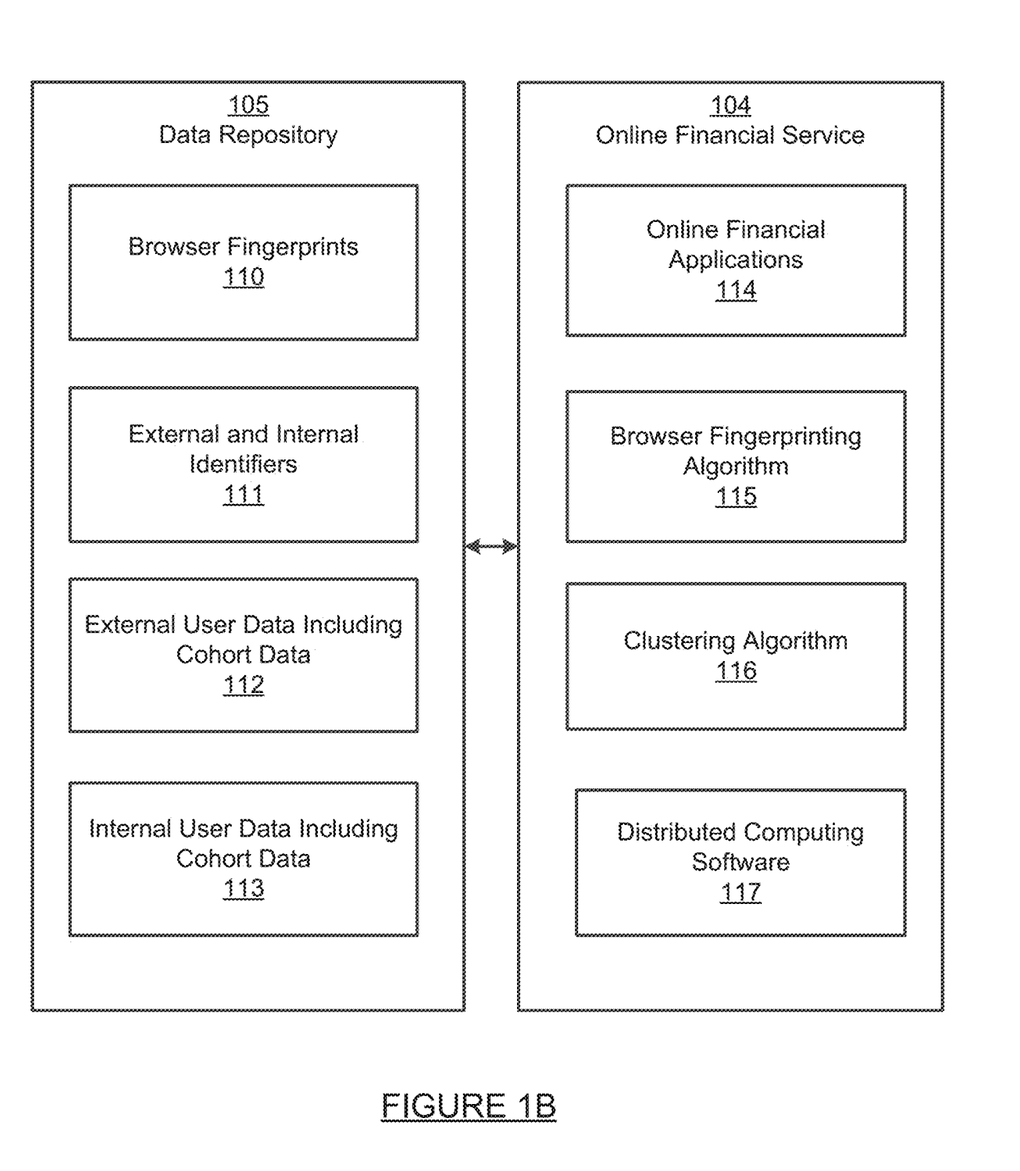
FIG. 1B depicts components used by a system providing a personalized interface for a user, in accordance with one or more embodiments.

FIG. 1B depicts components used by a system providing a personalized interface for a user, in accordance with one or more embodiments. In one or more embodiments, a data repository (105) stores browser fingerprints, e.g., as generated from browser metadata using a browser fingerprinting algorithm (115). It will be appreciated that such a browser fingerprint is both (a) unique and (b) reproducible, insofar the browser fingerprint will be consistently generated when presented with the same browser metadata. In one or more embodiments, such fingerprints might be associated with a user (e.g., a user's login credentials), a cohort (or segment) of users, and/or a group of cohorts (or segments). Such fingerprints are used to identify users of online financial applications (114) hosted by the online financial service (104). An example of a browser fingerprinting algorithm is the one described in Eckersley, "How unique is your browser?" (Electronic Frontier Foundation, 2010), which is incorporated herein by reference.

The data repository (105) also stores external and internal identifiers (111) for users of online financial applications (114) hosted by online financial service (104). In one or more embodiments, the external identifiers might be generated by a web or cloud analytics tool, such as Adobe Audience Manager, and the internal identifiers might be generated by the online financial service (104). The data repository (105) also stores external user data (112) received from the web or cloud analytics tool, including profile data and/or historical use data associated with a user and/or similar users (e.g., anonymized cohort data for similar users). The data repository (105) also stores internal user data (113), including profile data and/or historical use data associated with a user and/or similar users (e.g., anonymized cohort data for similar users). Here again, as suggested by the name, the internal user data might be generated by the online financial service (104). In one or more embodiments, any anonymized cohort data in the internal user data (113) might result from application of the clustering algorithm (116) using the distributed computing software (117), which might include HADOOP®, HADOOP® YARN, etc.

Figure 2A:
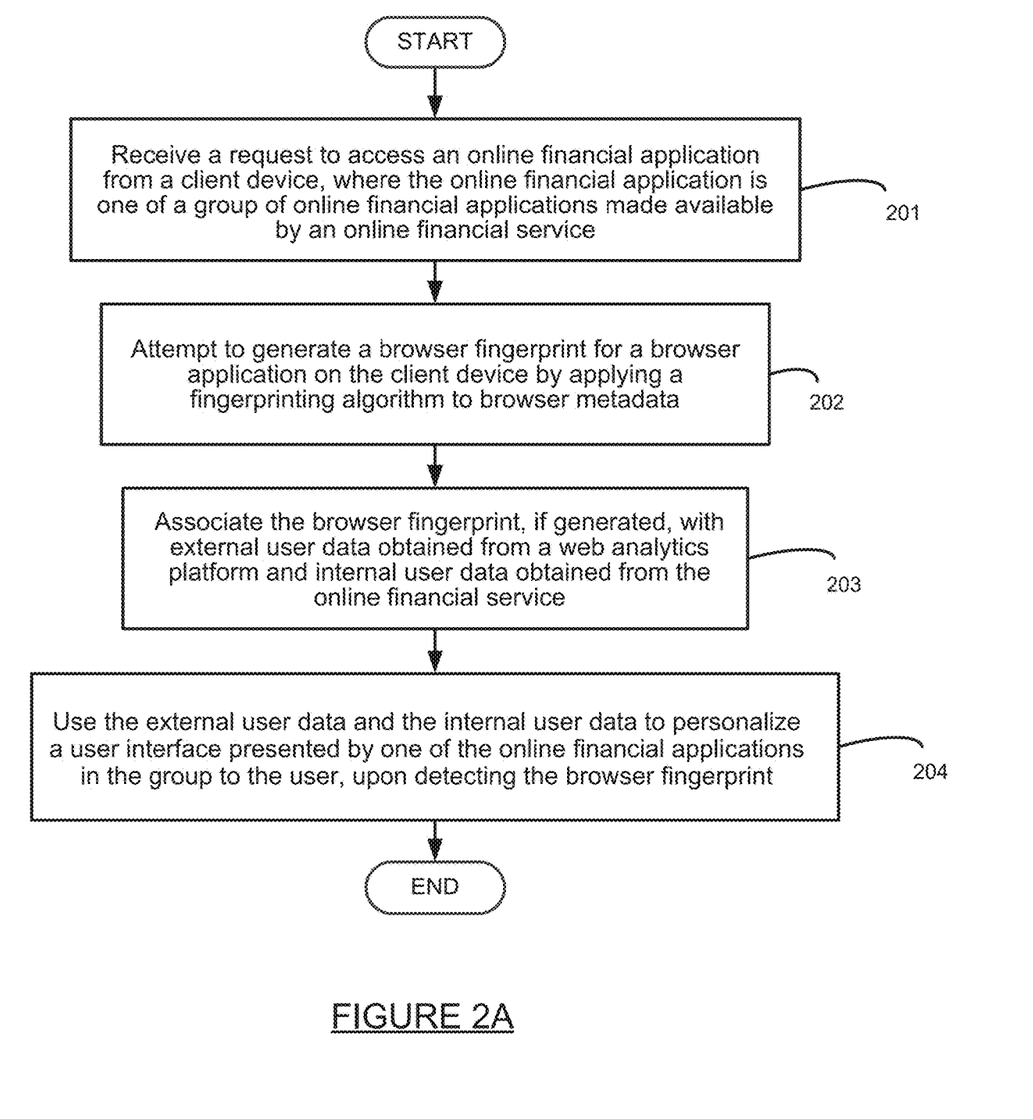
FIGS. 2A, 2B, 2C, and 2D depict flowchart diagrams of a process for providing a personalized interface for a user, in accordance with one or more embodiments.

FIG. 2A depicts a flowchart diagram of a process for providing a personalized interface for a user in a pre-authenticated state, in accordance with one or more embodiments. In one or more embodiments, the operations shown in this figure and in the other flowcharts described below might be performed by software running on servers at an online financial service using a data repository. In one or more embodiments, one or more of the operations shown in FIG. 2A and in the other flowcharts described below might be performed on clustered computers running distributed-computing software that supports batch processing based on a Map-Reduce architecture (e.g., HADOOP®) or that supports stream processing based on a Map-Reduce architecture (e.g., HADOOP® YARN architecture). In one or more embodiments, all or some of the operations shown in FIG. 2A and in the other flowcharts described below might be performed by software (e.g., a client application including, for example, a webpage with embedded JAVASCRIPT® scripting language program code or ACTIONSCRIPT® scripting language program code) running on a client device, e.g., user computing device X (102) or user computing device Y (103).

While the various operations in this flowchart and the flowcharts below are presented and described sequentially, one of ordinary skill will appreciate that some or all of the operations may be executed in different orders, may be combined or omitted, and some or all of the operations may be executed in parallel. Furthermore, the operations may be performed actively or passively. For example, some operations may be performed using polling or be interrupt-driven, in accordance with one or more embodiments of the invention. By way of an example, determination operations may not require a processor to process an instruction unless an interrupt is received to signify that a condition exists, in accordance with one or more embodiments of the invention. As another example, determination operations may be performed by performing a test, such as checking a data value to test whether the value is consistent with the tested condition, in accordance with one or more embodiments of the invention.

As depicted in FIG. 2A, software, e.g., running on servers at an online financial service, receives a request to access an online financial application from a client device, in operation 201. In one or more embodiments, the online financial application is one of a group of online financial applications made available by an online financial service.

In operation 202, the software attempts to generate a browser fingerprint for a browser application (e.g., a web browser) on the client device by applying a fingerprinting algorithm to browser metadata. In operation 203, the software associates the browser fingerprint, if generated, with external user data obtained from a web or cloud analytics tool and internal user data obtained from the online financial service. Then in operation 204, the software uses the external user data and the internal user data to personalize a user interface presented by one of the online financial applications in the group to the user, upon detecting the browser fingerprint. In one or more embodiments, the user interface might be a graphical user interface (GUI). Additionally or alternatively, the user interface might be a conversational interface. It will be appreciated that the operations in this figure describe a process for pre-authentication personalization, rather than post-authentication personalization that occurs after a user logs in.

Figure 2B:
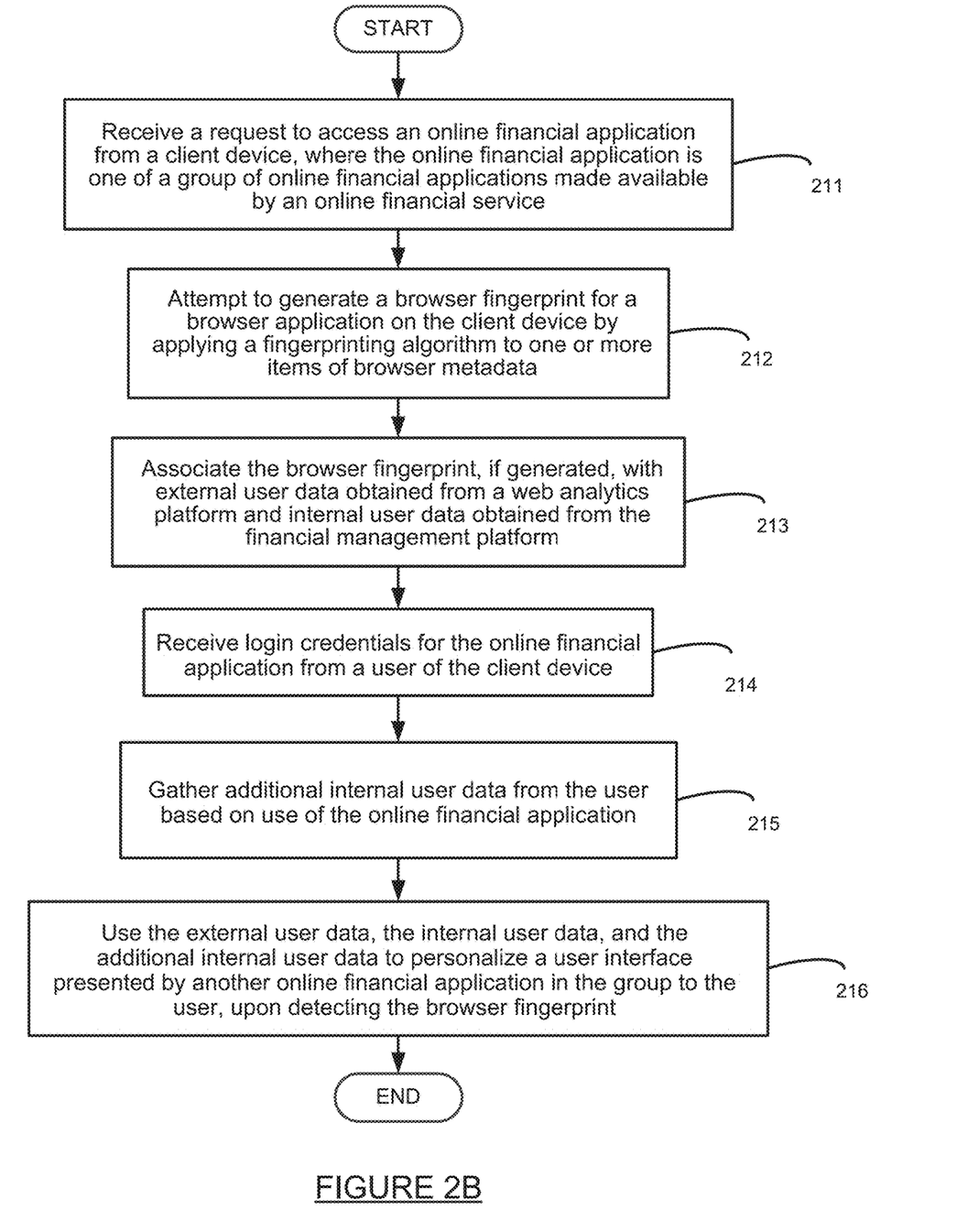

FIG. 2B depicts a flowchart diagram of another process for providing a personalized interface for a user, in accordance with one or more embodiments. In one or more embodiments, some or all of the operations depicted in this figure might be used with some or all of the operations in FIG. 2A. As depicted in FIG. 2B, software, e.g., running on servers at an online financial service, receives a request to access an online financial application from a client device, in operation 211. In one or more embodiments, the online financial application is one of a group of online financial applications made available by an online financial service.

In operation 212, the software attempts to generate a browser fingerprint for a browser application on the client device by applying a fingerprinting algorithm to browser metadata. In operation 213, the software associates the browser fingerprint, if generated, with external user data obtained from a web or cloud analytics tool and internal user data obtained from the online financial service. Then, in operation 214, the software receives login credentials for the online financial application from a user of the client device.

In operation 215, the software gathers additional internal user data from the user based on use of the online financial application. Then, in operation 216, the software uses the external user data, the internal user data, and the additional internal user data to personalize a user interface presented by another one of the online financial applications in the group to the user, upon detecting the browser fingerprint. Here again, in one or more embodiments, the user interface might be a graphical user interface (GUI). Additionally or alternatively, the user interface might be a conversational interface.

Figure 2C:
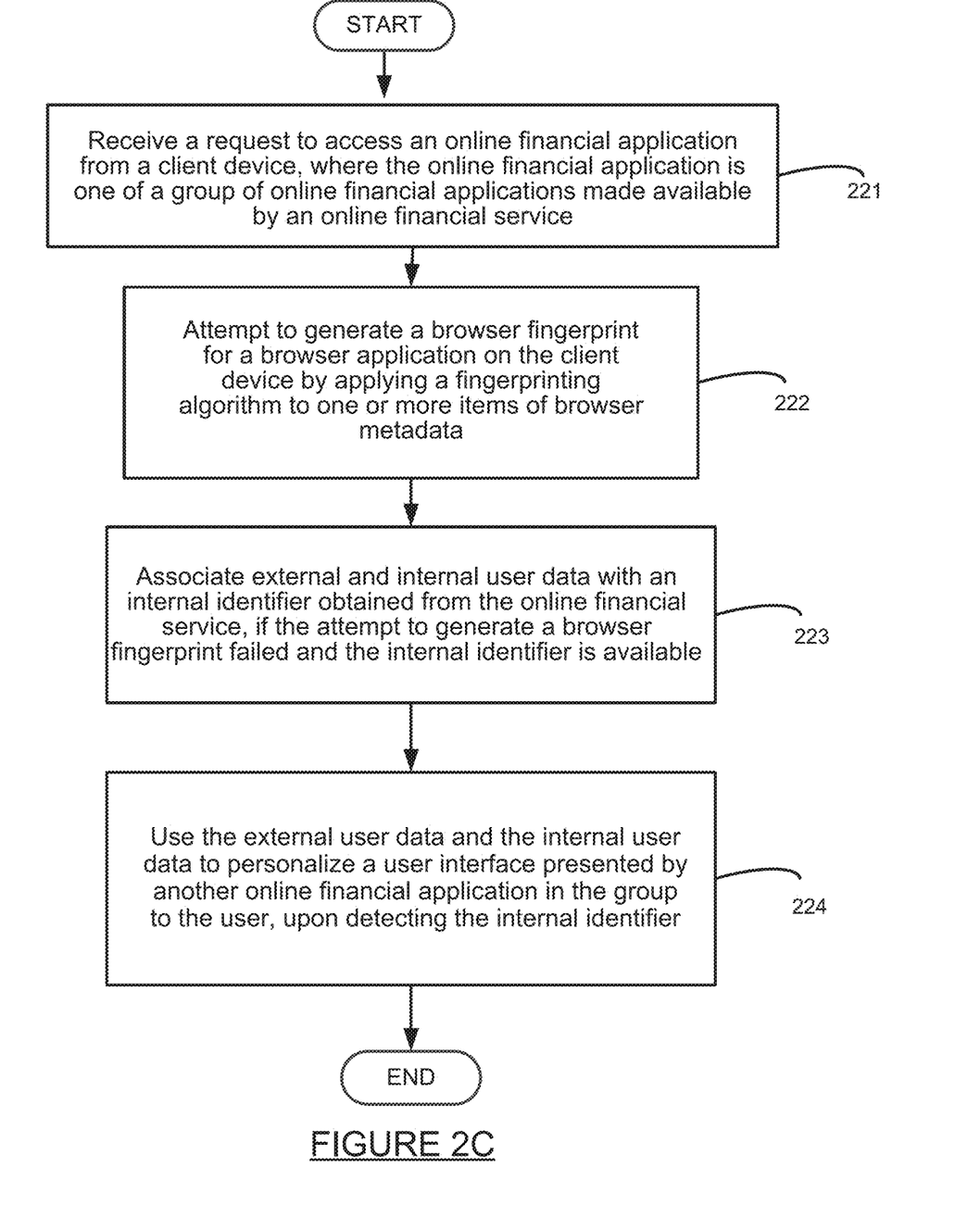

FIG. 2C depicts a flowchart diagram of a process for providing a personalized interface for a user when a browser fingerprint is unavailable, in accordance with one or more embodiments. In one or more embodiments, some or all of the operations depicted in this figure might be used with some or all of the operations in FIG. 2A and/or FIG. 2B. As depicted in FIG. 2C, software, e.g., running on servers at an online financial service, receives a request to access an online financial application from a client device, in operation 221. In one or more embodiments, the online financial application is one of a group of online financial applications made available by an online financial service.

In operation 222, the software attempts to generate a browser fingerprint for a browser application (e.g., a web browser) on the client device by applying a fingerprinting algorithm to browser metadata. In operation 223, the software associates external and internal user data with an internal identifier obtained from the online financial service, if the attempt to generate a browser fingerprint failed and the internal identifier is available. Then, in operation 224, the software uses the external user data and the internal user data to personalize a user interface presented by another online financial application in the group to the user, upon detecting the internal identifier.

Figure 2D:
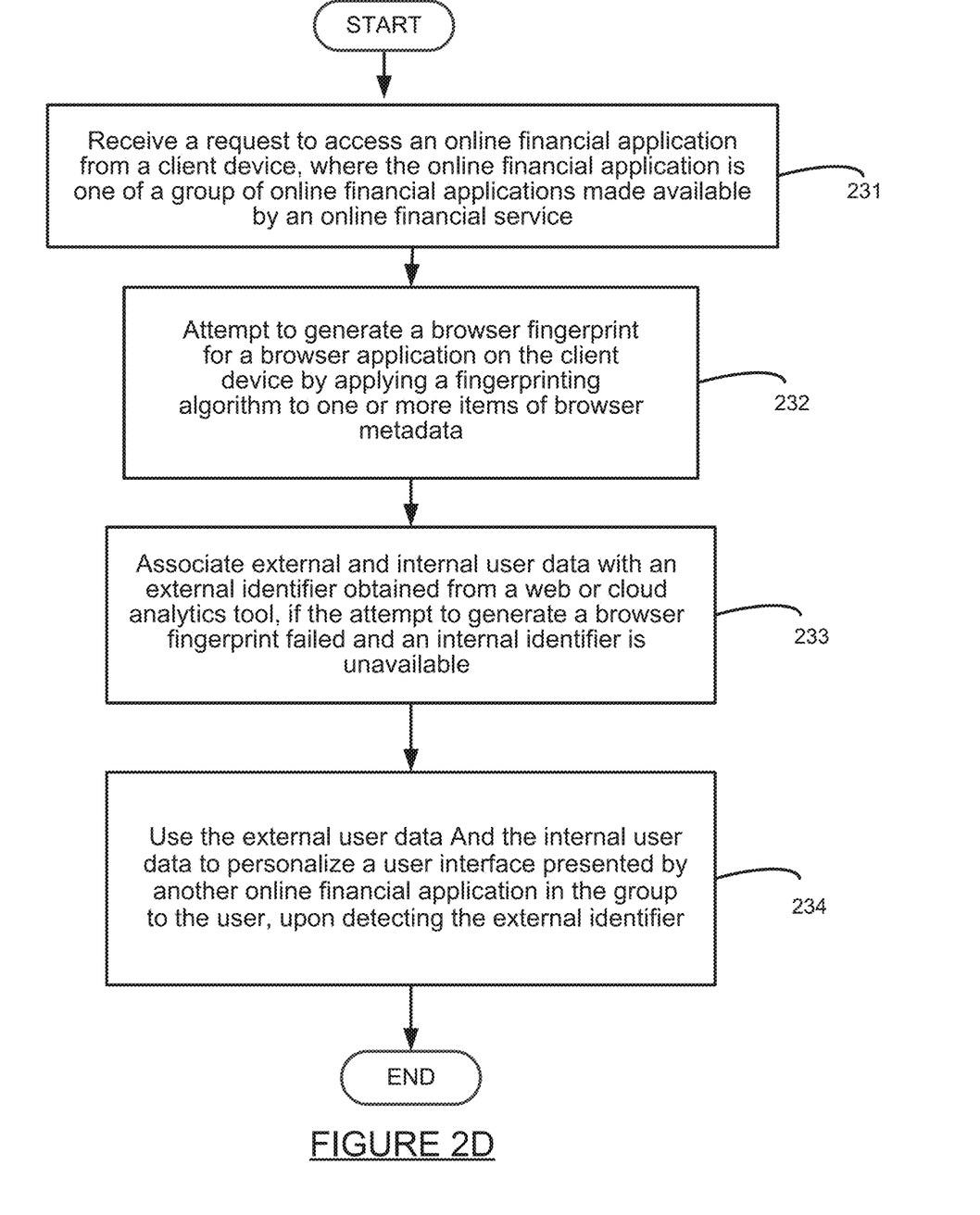

FIG. 2D depicts a flowchart diagram of another process for providing a personalized interface for a user when a browser fingerprint is unavailable, in accordance with one or more embodiments. In one or more embodiments, some or all of the operations depicted in this figure might be used with some or all of the operations in FIG. 2A, FIG. 2B, and/or FIG. 2C. As depicted in FIG. 2D, software, e.g., running on servers at an online financial service, receives a request to access an online financial application from a client device, in operation 231. In one or more embodiments, the online financial application is one of a group of online financial applications made available by an online financial service.

In operation 232, the software attempts to generate a browser fingerprint for a browser application (e.g., a web browser) on the client device by applying a fingerprinting algorithm to browser metadata. In operation 233, the software associates the external and internal user data with an external identifier obtained from, e.g., a web or cloud analytics tool, if the attempt to generate a browser fingerprint failed and an internal identifier is unavailable. Then, in operation 234, the software uses the external user data and the internal user data to personalize a user interface presented by another online financial application in the group to the user, upon detecting the external identifier.

In one or more embodiments, the software might identify a user, e.g., prior to login, using a browser fingerprint in combination with an external identifier and/or an internal identifier. Also, in one or more embodiments, the software might identify a user using a browser cookie, in combination with a browser fingerprint, an external identifier, and/or an internal identifier.

Figure 3:
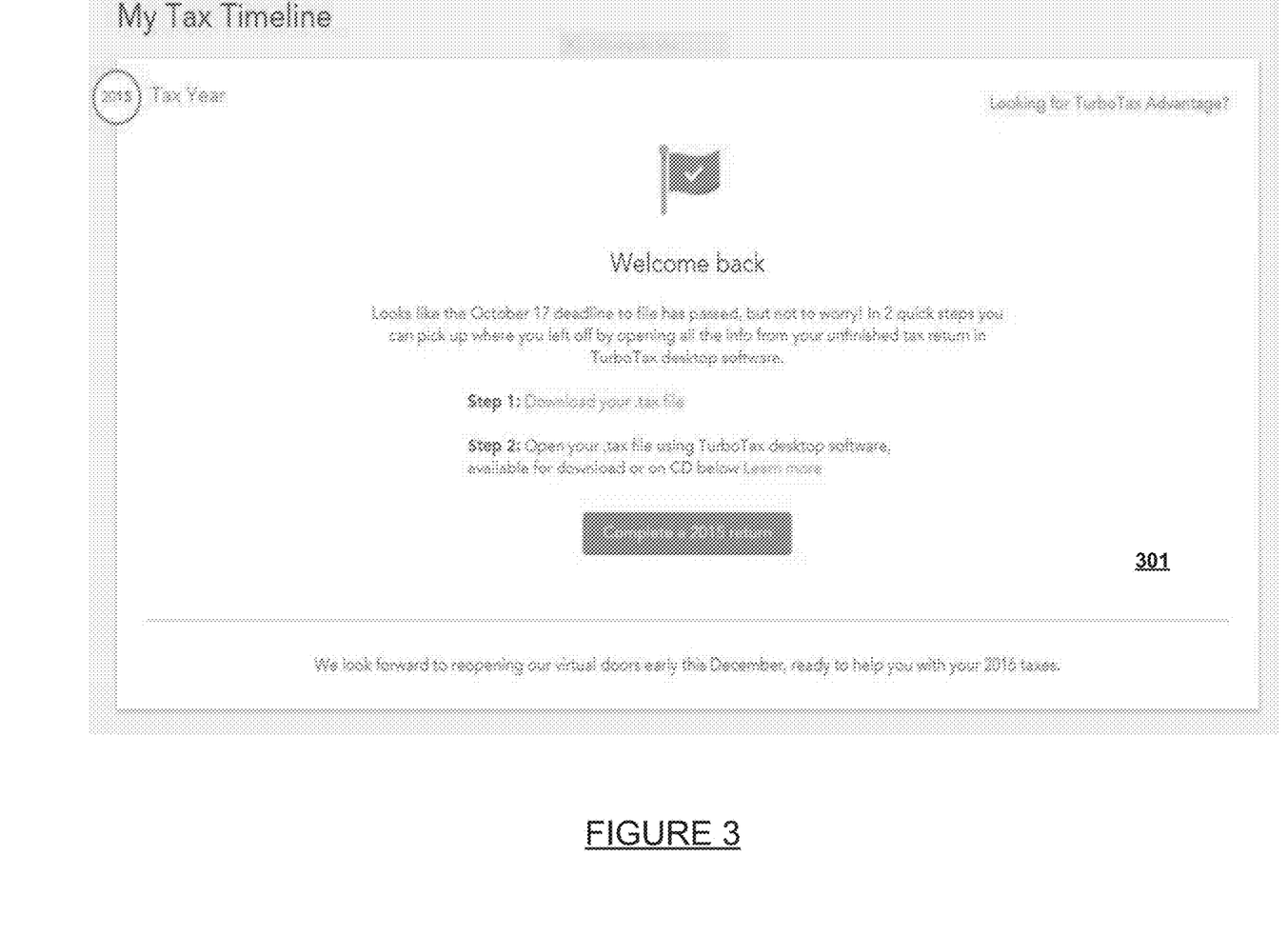
FIG. 3 shows a personalized view in a graphical user interface (GUI) for a user, in accordance with one or more embodiments.

FIG. 3 shows a personalized view in a graphical user interface (GUI) for a user, in accordance with one or more embodiments. The personalized view (301) shown in this figure is for an online tax application. In one or more embodiments, the personalized view (301) might be presented to an unauthenticated user, e.g., in operation 204 in FIG. 2A, in operation 224 in FIG. 2C, or in operation 234 in FIG. 2D. Additionally or alternatively, the personalized view (301) might be presented to an authenticated user, e.g., in operation 216 in FIG. 2B.

It will be appreciated that the personalized view (301) includes personalized text informing the user that "the October 17 deadline to file has passed". The personalized view (301) also includes a button control personalized with a label for "a 2015 return" rather than a "a 2016 return". Additionally or alternatively, these operations (e.g., operation 204 in FIG. 2A, in operation 224 in FIG. 2C, operation 234 in FIG. 2D, or operation 216 in FIG. 2B) might employ a conversational interface rather than a GUI. In such a case, the conversational interface might tell the user that "the October 17 deadline to file has passed" and ask the user if he/she would like to complete "a 2015 return".

Figure 4:
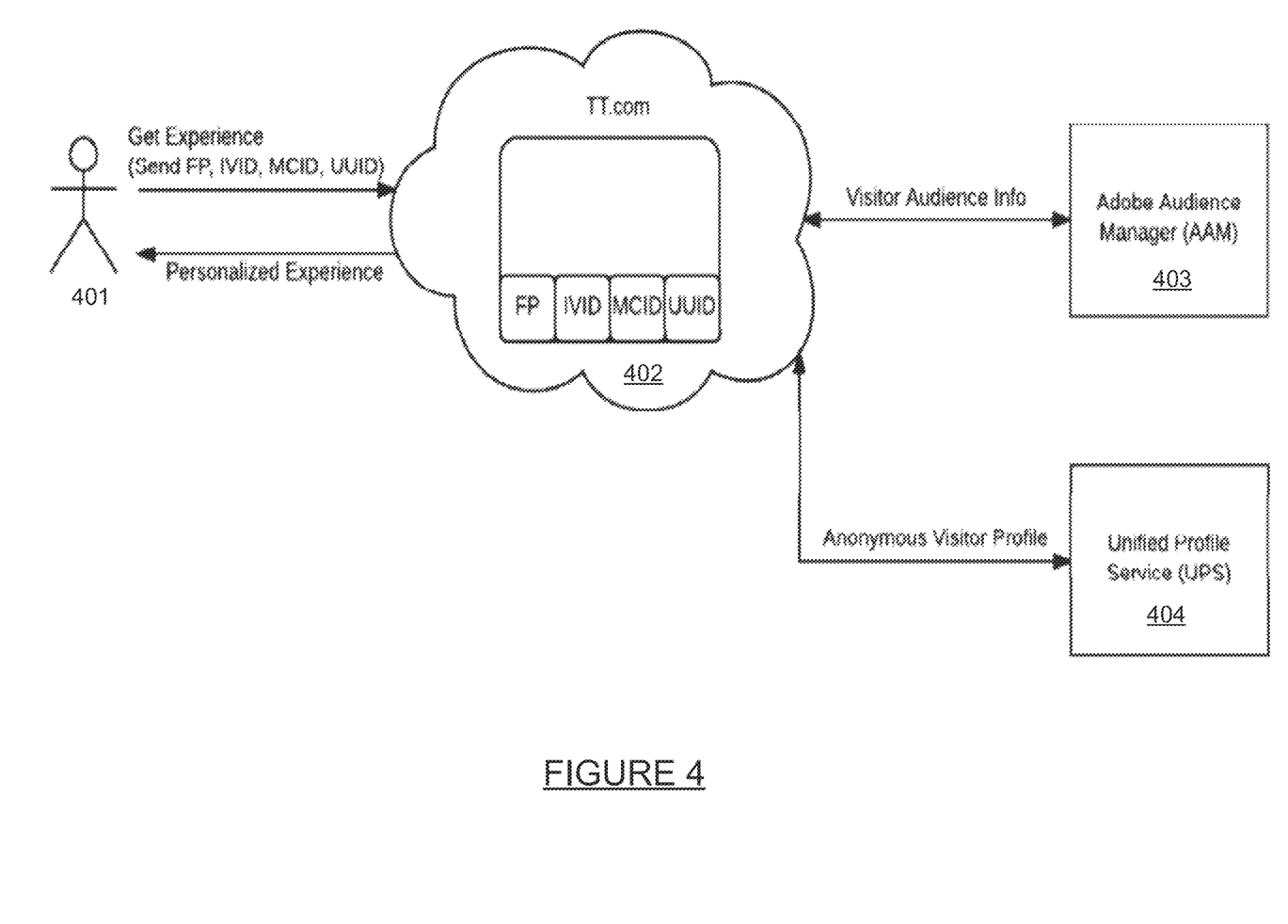
FIG. 4 depicts a use case for a system that includes functionality for providing a personalized interface for a user, in accordance with one or more embodiments.

The following use case is for explanatory purposes only and not intended to limit the scope of the invention. FIG. 4 depicts a use case for a system that includes functionality for providing a personalized interface for a user, in accordance with one or more embodiments. As depicted in this FIG. 4, a user (401) requests access to an online tax application (402) through his/her client device. If the unauthenticated user (411) has previously requested access to the online tax application or some other online financial application hosted by an online financial service, the online financial service will have generated a browser fingerprint (FP) for the browser on the user's client device, e.g., using a browser fingerprinting algorithm. Alternatively, if a browser fingerprint has not been generated, the online financial service might have generated an internal identifier, such as Intuit Vistor Identifier (IVID) for the user (411) and stored the internal identifier on the user's client device. Or if an internal identifier has not been generated, a web or cloud analytics tool (403), such as Adobe Audience Manager (AAM), will have generated an external identifier, such as Marketing Cloud Identifier or Universally Unique Identifier (MCID or UUID) for the user (411) and stored the external identifier on the user's client device and transmitted the external identifier to the online financial service.

Upon receipt of the browser fingerprint, the internal identifier, and/or the external identifier from the client device, the online tax application (402) retrieves external and internal user data relating to user (401). The external user data might be maintained by the web or cloud analytics tool (403). The internal user data is maintained by a unified profile service, such as Unified Profile ServiceUPS (404), which is part of the online financial service. The online tax application then uses the external user data and the internal user data to personalize one or more views in a GUI presented to the user (401), e.g., as shown in FIG. 3.

The user (401) uses one of the views to present login credentials and thereafter gains access to the online tax application (402) and creates additional internal user data, e.g., through a clickstream. At a subsequent time, the user (401) decides to become a user of the online accounting application hosted by the online financial service. When the user (401) requests access to the online accounting application, the online accounting application (a) uses the browser fingerprint (FP) to retrieve external and internal user data relating to user (401), including the additional user data created following the user's access to the online tax application (402), and (b) uses that external and internal user data to personalize views in a GUI presented to the user (401).

Figure 5A:
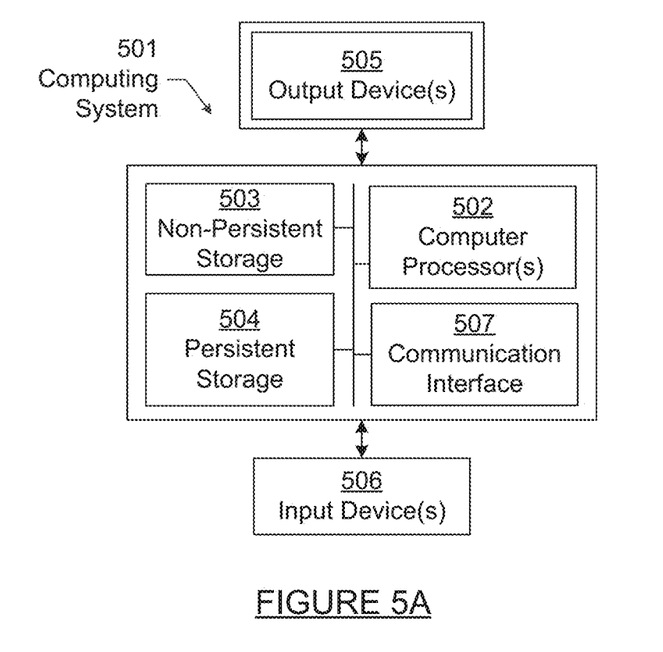
FIGS. 5A and 5B depict a computing system, in accordance with one or more embodiments of the invention.

Embodiments of the invention, including user computing device X (202) and user computing device Y (203), may be implemented on a computing system (501). Any combination of mobile, desktop, server, embedded, or other types of hardware may be used. For example, as shown in FIG. 5A, the computing system (501) may include one or more computer processor(s) (502), associated memory (503) (e.g., random access memory (RAM), cache memory, flash memory, etc.), one or more storage device(s) (504) (e.g., a hard disk, an optical drive such as a compact disk (CD) drive or digital versatile disk (DVD) drive, a flash memory stick, etc.), communication interface (507) and numerous other elements and functionalities. The computer processor(s) (502) may be an integrated circuit for processing instructions. For example, the computer processor(s) may be one or more cores, or micro-cores of a processor. The computing system (501) may also include one or more input device(s) (506), such as a touchscreen, keyboard, mouse, microphone, touchpad, electronic pen, or any other type of input device. Further, the computing system (501) may include one or more output device(s) (505), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (501) may be connected to a network (520) (e.g., a local area network (LAN), a wide area network (WAN) such as the Internet, mobile network, or any other type of network) via a network interface connection (not shown). The input and output device(s) may be locally or remotely (e.g., via the network (520)) connected to the computer processor(s) (502), memory (503), and storage device(s) (504). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (501) may be located at a remote location and connected to the other elements over a network (520). Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

Figure 5B:
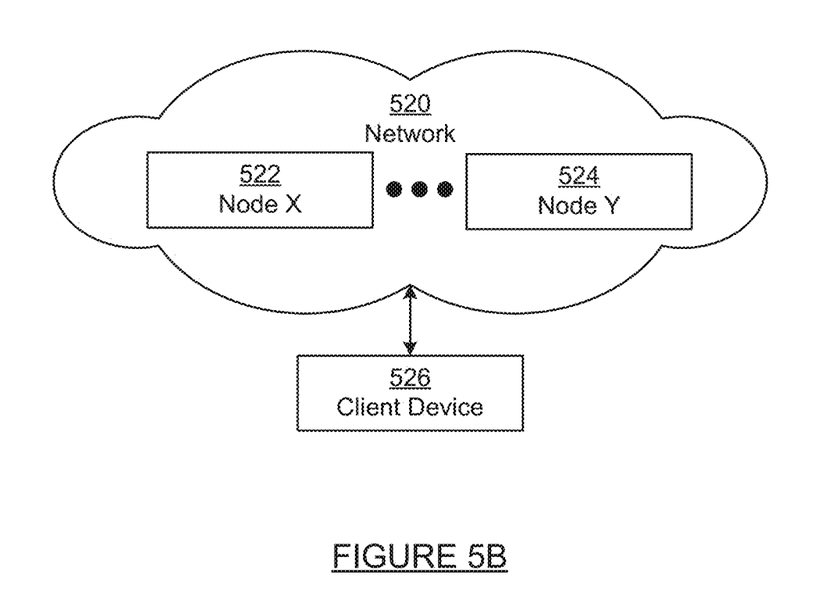

As noted above, the computing system (501) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (501) may be located at a remote location and connected to the other elements over a network.

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5A. Further, the client device (526) may include and/or perform all or a portion of one or more embodiments of the invention.

The computing system or group of computing systems described in FIGS. 5A and 5B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file.

The computing system in FIG. 5A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g., ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The above description of functions presents only a few examples of functions performed by the computing system of FIG. 5A and the nodes and/or client device in FIG. 5B. Other functions may be performed using one or more embodiments of the invention.

Although example embodiments of the inventions have been described in some detail for purposes of clarity of understanding, it will be apparent that certain changes and modifications can be practiced within the scope of the following claims. Moreover, the operations described above can be ordered, modularized, and/or distributed in any suitable way. Accordingly, the present embodiments are to be considered as illustrative and not restrictive, and the inventions are not to be limited to the details given herein, but may be modified within the scope and equivalents of the following claims. In the following claims, elements and/or steps do not imply any particular order of operation, unless explicitly stated in the claims or implicitly required by the disclosure.

What is claimed is:

1. A method, comprising:
   receiving a request to access a first online financial application from a client device,
      wherein the first online financial application is one of a plurality of online financial applications made available by an online financial service, and
      wherein the plurality of online financial applications includes a second online financial application;
   generating a browser fingerprint for a browser application on the client device by applying a fingerprinting algorithm to browser metadata, wherein the fingerprinting algorithm generates a unique and reproducible browser fingerprint for the client device from the browser metadata, the browser metadata obtained from a web browser of the client device;

associating, in a user profile, the browser fingerprint with external user data obtained from a web analytics tool and internal user data obtained from the online financial service;

receiving login credentials for the first online financial application from a user of the client device;

retrieving, using the login credentials, additional internal user data maintained by the online financial service;

receiving, from the user, a request to access the second online financial application;

detecting the browser fingerprint from the client device based on the request to access the second online financial application; and prior to authenticating the user for the second online financial application:

retrieving, using the browser fingerprint, the external user data, the internal user data, and the additional internal user data from the user profile, and     personalizing, using the external user data, the internal user data, and the additional internal user data, a user interface presented by the second online financial application to the user to obtain a personalized user interface.

2. The method of claim 1, wherein the additional internal user data includes anonymized cohort data.

3. The method of claim 2, wherein the anonymized cohort data is generated using a clustering algorithm.

4. The method of claim 1, further comprising:

associating the external user data and the internal user data with an internal identifier obtained from the online financial service, if an attempt to generate the browser fingerprint failed and the internal identifier is available; and personalizing, upon detecting the internal identifier and using the external user data, the internal user data, and the additional internal user data, the user interface presented by the second online financial application to the user.

5. The method of claim 4, further comprising:

associating the external user data and the internal user data with an external identifier obtained from the web analytics tool, if the attempt to generate the browser fingerprint failed and the internal identifier is unavailable; and personalizing, upon detecting the external identifier and using the external user data, the internal user data, and the additional internal user data, the user interface presented by the second online financial application to the user.

6. The method of claim 1, further comprising:

after personalizing the user interface, authenticating the user into the second online financial application using the personalized user interface.

7. The method of claim 1, further comprising:

using the external user data and the internal user data to personalize a user interface presented by the first online financial application to the user, upon detecting the browser fingerprint.

8. A non-transitory computer-readable media storing a program, which when executed by a processor, performs operations comprising:

receiving a request to access a first online financial application from a client device,     wherein the first online financial application is one of a plurality of online financial applications made available by an online financial service, and     wherein the plurality of online financial applications includes a second online financial application;

generating a browser fingerprint for a browser application on the client device by applying a fingerprinting algorithm to browser metadata, wherein the fingerprinting algorithm generates a unique and reproducible browser fingerprint for the client device from the browser metadata, the browser metadata obtained from a web browser of the client device;

associating, in a user profile, the browser fingerprint, if generated, with external user data obtained from a web analytics tool and internal user data obtained from the online financial service;

receiving login credentials for the first online financial application from a user of the client device;

retrieving, using the login credentials, additional internal user data maintained by the online financial service;

receiving, from the user, a request to access the second online financial application;

detecting the browser fingerprint from the client device based on the request to access the second online financial application; and prior to authenticating the user for the second online financial application:

retrieving, using the browser fingerprint, the external user data, the internal user data, and the additional internal user data from the user profile, and     personalizing, using the external user data, the internal user data, and the additional internal user data, a user interface presented by the second online financial application to the user to obtain a personalized user interface.

9. The non-transitory computer-readable media of claim 8, wherein the additional internal user data includes anonymized cohort data.

10. The non-transitory computer-readable media of claim 9, wherein the anonymized cohort data is generated using a clustering algorithm.

11. The non-transitory computer-readable media of claim 8, wherein the operations further comprise:

associating the external user data and the internal user data with an internal identifier obtained from the online financial service, if an attempt to generate the browser fingerprint failed and the internal identifier is available; and personalizing, upon detecting the internal identifier and using the external user data, the internal user data, and the additional internal user data, the user interface presented by the second online financial application to the user.

12. The non-transitory computer-readable media of claim 11, wherein the operations further comprise:

associating the external user data and the internal user data with an external identifier obtained from the web analytics tool, if the attempt to generate the browser fingerprint failed and the internal identifier is unavailable; and personalizing, upon detecting the external identifier and using the external user data, the internal user data, and the additional internal user data, the user interface presented by the second online financial application to the user.

13. The non-transitory computer-readable media of claim 8, wherein the operations further comprise:

after personalizing the user interface, authenticating the user into the second online financial application using the personalized user interface.

14. The non-transitory computer-readable media of claim 8, wherein the operations further comprise:
using the external user data and the internal user data to personalize a user interface presented by the first online financial application to the user, upon detecting the browser fingerprint.

15. A system, comprising:
a hardware processor and memory; and
software instructions stored in the memory, which when executed by the hardware processor, cause the hardware processor to:
receive a request to access a first online financial application from a client device,
wherein the first online financial application is one of a plurality of online financial applications made available by an online financial service, and
wherein the plurality of online financial applications includes a second online financial application,
generate a browser fingerprint for a browser application on the client device by applying a fingerprinting algorithm to browser metadata, wherein the fingerprinting algorithm generates a unique and reproducible browser fingerprint for the client device from the browser metadata, the browser metadata obtained from a web browser of the client device,
associate, in a user profile, the browser fingerprint, if generated, with external user data obtained from a web analytics tool and internal user data obtained from the online financial service,
receive login credentials for the first online financial application from a user of the client device,
use the login credentials to retrieve additional internal user data maintained by the online financial service,
receive, from the user, a request to access the second online financial application;
detect the browser fingerprint from the client device based on the request to access the second online financial application; and
prior to authenticating the user for the second online financial application:
retrieving, using the browser fingerprint, the external user data, the internal user data, and the additional internal user data from the user profile, and
personalize, using the external user data, the internal user data, and the additional internal user data, a user interface presented by the second online financial application to the user to obtain a personalized user interface.

16. The system of claim 15, wherein the additional internal user data includes anonymized cohort data.

17. The system of claim 16, wherein the anonymized cohort data is generated using a clustering algorithm.

18. The system of claim 15, wherein the software instructions, when executed by the hardware processor, cause the hardware processor to:
associate the external user data and the internal user data with an internal identifier obtained from the online financial service, if an attempt to generate the browser fingerprint failed and the internal identifier is available; and
personalize, upon detecting the internal identifier and using the external user data, the internal user data, and the additional internal user data, the user interface presented by the second online financial application to the user.

19. The system of claim 18, wherein the software instructions, when executed by the hardware processor, cause the hardware processor to:
associate the external user data and the internal user data with an external identifier obtained from the web analytics tool, if the attempt to generate the browser fingerprint failed and the internal identifier is unavailable; and
personalize, upon detecting the external identifier and using the external user data, the internal user data, and the additional internal user data, the user interface presented by the second online financial application to the user.

20. The system of claim 15, wherein the software instructions, when executed by the hardware processor, cause the hardware processor to:
use the external user data and the internal user data to personalize the user interface presented by the first online financial application to the user, upon detecting the browser fingerprint.

* * * * *